US006876110B2

(12) United States Patent
Brown

(10) Patent No.: US 6,876,110 B2
(45) Date of Patent: Apr. 5, 2005

(54) ELECTRIC MOTOR STATOR CURRENT CONTROLLER

(75) Inventor: Fred A. Brown, Coronado, CA (US)

(73) Assignee: Comair Rotron, Inc., San Diego, CA (US)

( * ) Notice: Subject to any disclaimer, the term of this patent is extended or adjusted under 35 U.S.C. 154(b) by 0 days.

(21) Appl. No.: 10/642,433

(22) Filed: Aug. 15, 2003

(65) Prior Publication Data

US 2005/0035674 A1 Feb. 17, 2005

(51) Int. Cl.$^7$ ............................................. H02K 11/00
(52) U.S. Cl. ............................... 310/68 B; 31/DIG. 6; 31/68 R
(58) Field of Search ....................... 310/68 R, 68 B, 310/DIG. 3, DIG. 6

(56) References Cited

U.S. PATENT DOCUMENTS

| | | | | |
|---|---|---|---|---|
| 4,547,714 A | * | 10/1985 | Muller | 318/254 |
| 4,554,473 A | * | 11/1985 | Muller | 310/67 R |
| 4,620,139 A | * | 10/1986 | Egami et al. | 318/254 |
| 4,659,951 A | * | 4/1987 | Angi et al. | 310/62 |
| 4,728,833 A | * | 3/1988 | Shiraki et al. | 310/68 R |
| 4,728,834 A | * | 3/1988 | Kumar et al. | 310/68 R |
| 4,734,603 A | | 3/1988 | von der Heide et al. | 310/72 |
| 4,806,813 A | | 2/1989 | Sumi et al. | 310/254 |
| 4,851,752 A | | 7/1989 | Nishimura et al. | 318/602 |
| 4,900,968 A | * | 2/1990 | Feigel et al. | 310/260 |
| 4,910,420 A | * | 3/1990 | Hoover et al. | 310/68 B |
| 4,992,688 A | | 2/1991 | Cap et al. | 310/71 |
| 5,089,733 A | * | 2/1992 | Fukuoka | 310/67 R |
| 5,879,785 A | | 3/1999 | Shin | 428/209 |
| 5,895,994 A | * | 4/1999 | Molnar et al. | 310/215 |
| 6,097,129 A | * | 8/2000 | Furtwangler et al. | 310/256 |
| 6,127,752 A | | 10/2000 | Wiesler | 310/68 B |
| 6,335,578 B1 | * | 1/2002 | Katsumi et al. | 310/68 B |
| 6,354,162 B1 | | 3/2002 | Bobay et al. | 73/866.5 |
| 6,552,458 B1 | * | 4/2003 | Hsu | 310/91 |
| 6,608,411 B2 | * | 8/2003 | Horng et al. | 310/68 R |
| 6,710,504 B2 | * | 3/2004 | Ohiwa et al. | 310/257 |

FOREIGN PATENT DOCUMENTS

| | | | | |
|---|---|---|---|---|
| FR | 002691594 A1 | 11/1993 | | 310/152 |
| JP | 403173341 A | 7/1991 | | 310/152 |
| JP | 4371015 | 12/1992 | | H03K/3/59 |

OTHER PUBLICATIONS

Hendershot, J.R. Brushless D.C. Motors without Permanent Magnets, pp. 1–13, 1990 (http://www.integratedsoft.com/papers/techdocs/tech 6mx.pdf, Feb. 13, 2003).

SS4/SS5/SS400/SS500 Low Gauss Bipolar Hall Effect Sensors, pp. 1–3, 1998–2003 (http://content.honeywell.com/sensing/prodinto/solidstate/application/ap_005849_1.pdf, Feb. 13, 2003).

S72/73 24V 450 mA Hall IC Coil Fan Driver, pp. 1–4, Preliminary, Melexis, 2002.

Adamson, Eric Application Note DC Brushless Fans, pp. 1–6, Apr. 12, 1998 (http://www.egr.msu.edu/classes/ece482/Reports/appnotes/98spr/ad amsone/appnote.html, Feb. 13, 2003).

Brushless Motor Technical Information, pp. 1–2, 1996, (http://wwo.electrosales.com/bodine/brushless_info.html, Feb. 13, 2003).

(Continued)

*Primary Examiner*—Burton Mullins
(74) *Attorney, Agent, or Firm*—Bromberg & Sunstein LLP

(57) ABSTRACT

An electric motor stator current controller. The inner surface of the motor rotor defines a bounded region. A circuit board containing a magnetic field detector for detecting a magnetic field produced by the rotor magnet is coupled to the arbor and lies, at least in part, within the bounded region.

18 Claims, 4 Drawing Sheets

OTHER PUBLICATIONS

LeCoz, Loic Evolution of Industrial Motor Control, Embedded System Show, pp. 1–12, Apr. 26, 2001 (http://www.m16c.de/PDF/AppNotes/APP$_{13}$ Motor/APP55 Evolmotor.pdf, Feb. 13, 2003.

Motor Design, Quality and Performance are Critical to Reliable Operation of Fans & Blowrs, pp. 15–17, 1995–1999, (http://synergy.sagar.com/productPDFs/mototr.pdf, Feb. 13, 2003.

Ohm et al. About Commutation and Current Control Methods for Brushless Motors, 29$^{th}$ IMCSD Symposium, San Jose, pp. 1–11, Jul. 26–29, 1999 (http://www.drivetechnic.com/articles/curbldc3.pdf, Feb. 13, 2003).

Shafer, Tim Different Methods to Control Fan Speed, pp. 1–3, Aug. 10, 1998 (http://www.comairrotron.com/Engineering/ControlFanSpeed.hum, Feb. 13, 2003).

Introduction to Motion Control Technology, pp. K22–K24, Oct. 13, 1999 (http://www.idmotion.com/pdf/9012.pdf, Feb. 13, 2003).

Brushless DC Fans, pp. 1–2, 1984 (http://www.comairrotron.com/Engineering/BLDCfans.htm, Feb. 13, 2003).

Lee, Edward C. Review of Variable Speed Drive Technology, pp. 1–13, Feb. 23, 2001 (http://powertecmotors.com/avsde4.pdf, Feb. 13, 2003.

A Tutorial on the New Magnetoresistive Technology Current Sensor, pp. 1–3, Nov. 7, 2002 (http://www.sypris.com/stm/content/asp?page id=396, Feb. 14, 2003).

3503 Ratiometric, Linear Hall–Effect Sensors, Data Sheet 27501B, pp. 1–8, Aug. 19, 2000 (http://www.allegromicro.com/datefile/3503.pdf, Feb. 13, 2003).

AD22151 Linear Output Magnetic Field Sensor, pp. 1–8, 2003 (http://www.analog.com/UploadedFiles/Data_Sheets/78636627AD22151$_{13}$ a.pdf, Feb. 13, 2003).

Dwyer, Daniel Differential Hall–Effect Sensor Aid Rotational Speed Control, pp. 1–14, Nov. 27, 2002 (http://www.planetanalog.com/features/EG2002/122750031, May 20, 2003).

Motor Theory 1, pp. 1–6, 2002 (http://www.innovatia.com/Design Center/Electronic Design for Motor Control 1.htm, Feb. 13, 2003.

Motor Theory 2, pp. 1–7, 2002 (http://www.innovatia.com/DesignCenter/Electronic_Design for Motor Control 2.htm, Feb. 13, 2003.

Navy Electricity and Electronics Training Series, Nonresident Training Course, Module 5–Introduction to Generators and Motors, NAVESTRA 14177, p. 1–1–4–18, 1998 (http://www.iirg.org/ticom/neetes/NEETS–VOS–MOTORS.pdf, Feb. 13, 2003).

* cited by examiner

ELECTRIC MOTOR STATOR CURRENT CONTROLLER

TECHNICAL FIELD

The present invention relates to electric motors and, more particularly, to circuits that control stator currents within electric motors.

BACKGROUND ART

To achieve desired motor movement, the phase of currents flowing through motor windings must be synchronized. In DC motors employing rotor magnets, currents of the stator windings must be phased properly so that the angular position of the magnetic field generated by the stator currents has the proper orientation with respect to the magnetic fields associated with the rotor magnets. Key to proper phasing is knowledge of the angular position of the rotor and its magnets relative to that of the stator. In DC motors with commutators (i.e., brushes), proper phasing is done automatically. In contrast, brushless DC motors require detectors to detect changes in the magnetic fields associated with changes in the angular position of the rotors.

Magnetic field detectors often incorporate a Hall effect device mounted on a printed circuit board. Orientation of the Hall effect device is important because the device is most sensitive to magnetic fields perpendicular to one pair of its surfaces. To that end, many motors mount a Hall effect device on a printed circuit board that is perpendicular to the rotor axis. To be properly oriented to sense the magnetic field generated by the rotor magnets, the Hall effect device is mounted on its edge perpendicular to the circuit board, usually occupying a region between the rotor magnets and the stator so as to permit the device to detect the magnetic fields produced by the rotor magnets.

Surface mounting circuitry produces significant cost advantages in terms of speed of assembly. However, surface mounting the Hall effect device on a circuit board located perpendicular to the rotor axis both 1) removes the device from the region of maximum magnetic field and 2) orients the device in a manner that is least sensitive to the magnetic fields generated by the rotor magnets. In other words, mounting a Hall effect device in this manner does not permit its surfaces to be perpendicular to the magnetic field, thus minimizing its functionality.

SUMMARY OF THE INVENTION

In accordance with one aspect of the invention, a stator current controller is provided within an electric motor having a stator, a rotor with a rotor magnet, and an arbor for securing the rotor to the stator. The rotor has an inner surface defining a bounded region. A circuit board containing a magnetic field detector for detecting a magnetic field produced by the rotor magnet is coupled to the arbor and lies, at least in part, within the bounded region.

In accordance with a further aspect of the invention, the magnetic field detector may be positioned closer to the bottom end of the arbor than to the top end. The circuit board may be snapped onto the arbor and may be oriented not to be perpendicular to an arbor axis.

In accordance with a still further aspect of the invention, the magnetic field detector may be contained in a chip surface mounted onto the circuit board and may include a Hall effect device. Electrical connections to the printed circuit board may include connections to a voltage supply, to ground, and to a plurality of stator windings.

In accordance with still another aspect of the invention, a motor may incorporate the magnetic field detector. The motor may be a brushless DC motor.

BRIEF DESCRIPTION OF THE DRAWING

The foregoing features of the invention will be more readily understood by reference to the following detailed description, taken with reference to the accompanying drawings, in which.

DETAILED DESCRIPTION OF SPECIFIC EMBODIMENTS

Because of their economy and performance, DC electric motors are used in a variety of appliances, such as fans. Control of the applied DC voltage permits a wide variation in speed and torque in a compact package. The magnetic fields generated by currents flowing through the windings of the stationary stator interact with magnetic fields generated by magnets on the rotating rotor to create rotor torque.

Proper rotor rotation requires that the stator magnetic field have a spatial relationship with the rotor magnetic field. Temporal sequencing of the electrical currents flowing through the stator windings specifies this relationship. Previously, switching was done by mechanical commutation. As the rotor turned, different windings were energized. More recent brushless DC motors avoid problems of mechanical wear and variation of brushes by electronically switching the currents flowing through the stator windings. Proper switching, however, requires an accurate position of the rotor relative to the stator.

Rotor position may be sensed by means of a Hall effect device positioned to detect rotor magnetic fields. Maximum sensitivity may be achieved by measuring the magnetic field at a location where the rotor magnetic field is greatest. Maximum accuracy may be achieved by ensuring that the magnetic field exhibits little spatial variation at the measurement location. Although the magnetic field sensor may be positioned underneath the edge of the rotor, reliance on small fringing fields may require accurate placement of the sensor very close to the rotating magnets. In illustrative embodiments discussed below, the Hall effect device is located within the cylinder formed by the inner surface of the rotor magnets. The Hall effect device thus measures the radial magnetic field generated by the rotor magnets. It is preferable to measure the radial magnetic field because, unlike the fringing magnetic fields, the radial magnetic field is substantial and relatively uniform.

The location of the Hall effect device within the rotor radial magnetic field constrains its mounting on a printed circuit board that also carries associated electronics. For an edge mounted Hall effect device, the board may be mounted horizontally beneath the rotor. However, for a Hall effect device surface mounted on such a board, as is advantageous from an assembly point of view, the limited elevation of the device above the board does not allow the device to interact with the radial magnetic fields. Rather, the Hall effect device only interacts with the less substantial fringing magnetic fields. To overcome this problem, aspects of the invention permit detection of rotor position through measurement of radial magnetic fields with a surface mounted Hall effect device. Details are discussed below.

Figure 1:
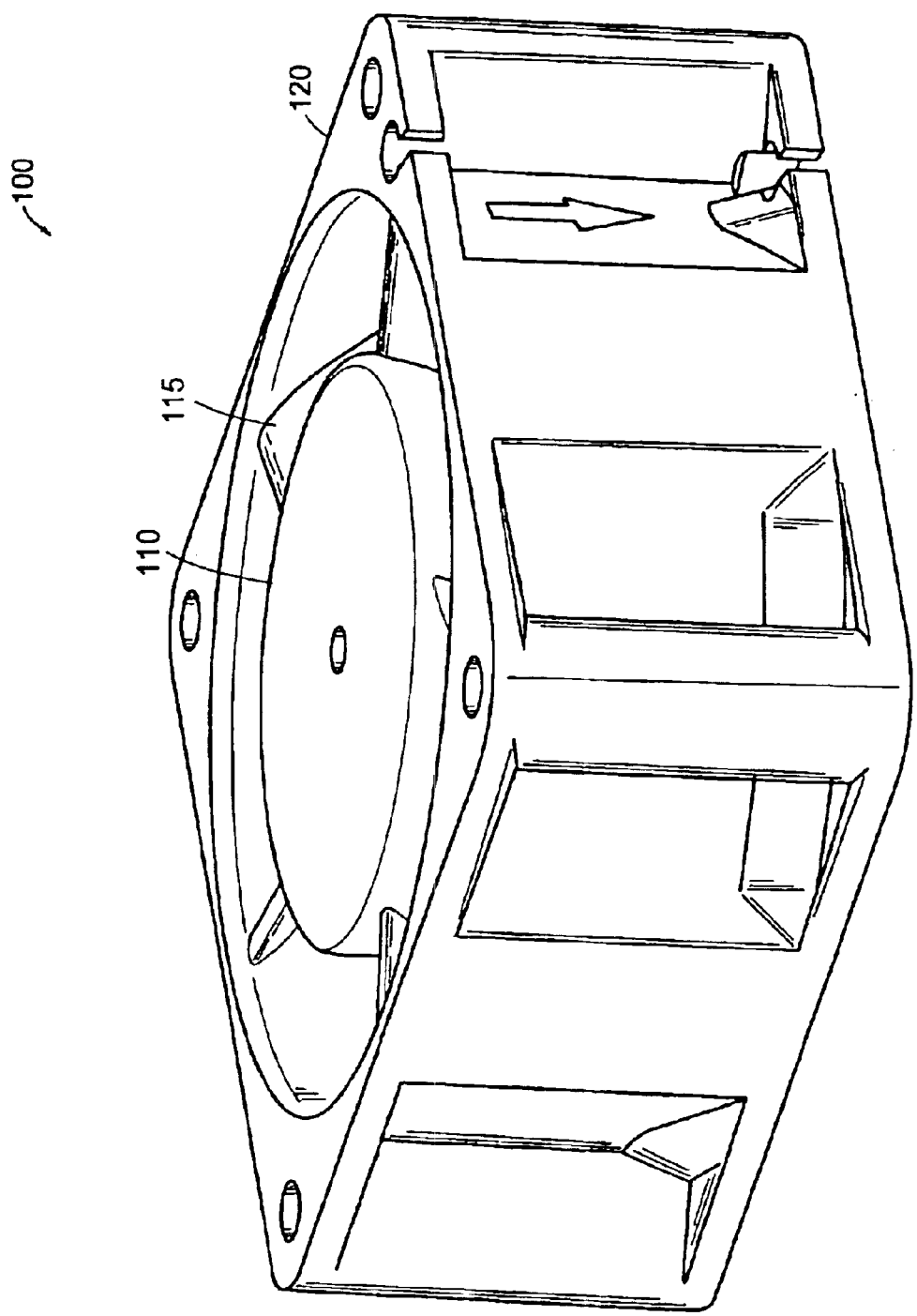
FIG. 1 shows an electric fan that may include a magnetic field detector in accordance with illustrative embodiments of the invention.

FIG. 1 illustrates a cooling fan embodiment of a DC electric motor having an illustrative stator current controller that incorporates a magnetic field detector. A cooling fan 100 contains a rotor 110 mounted within a venturi housing 120. As the rotor 110 revolves, fins 115 attached to the rotor 110 cause air to flow through the housing 120. The fan 100 operates in a conventional manner, such as that described in U.S. Pat. No. 4,656,553, hereby incorporated in its entirety by reference to the extent that it is consistent with embodiments of this invention.

Figure 2A:
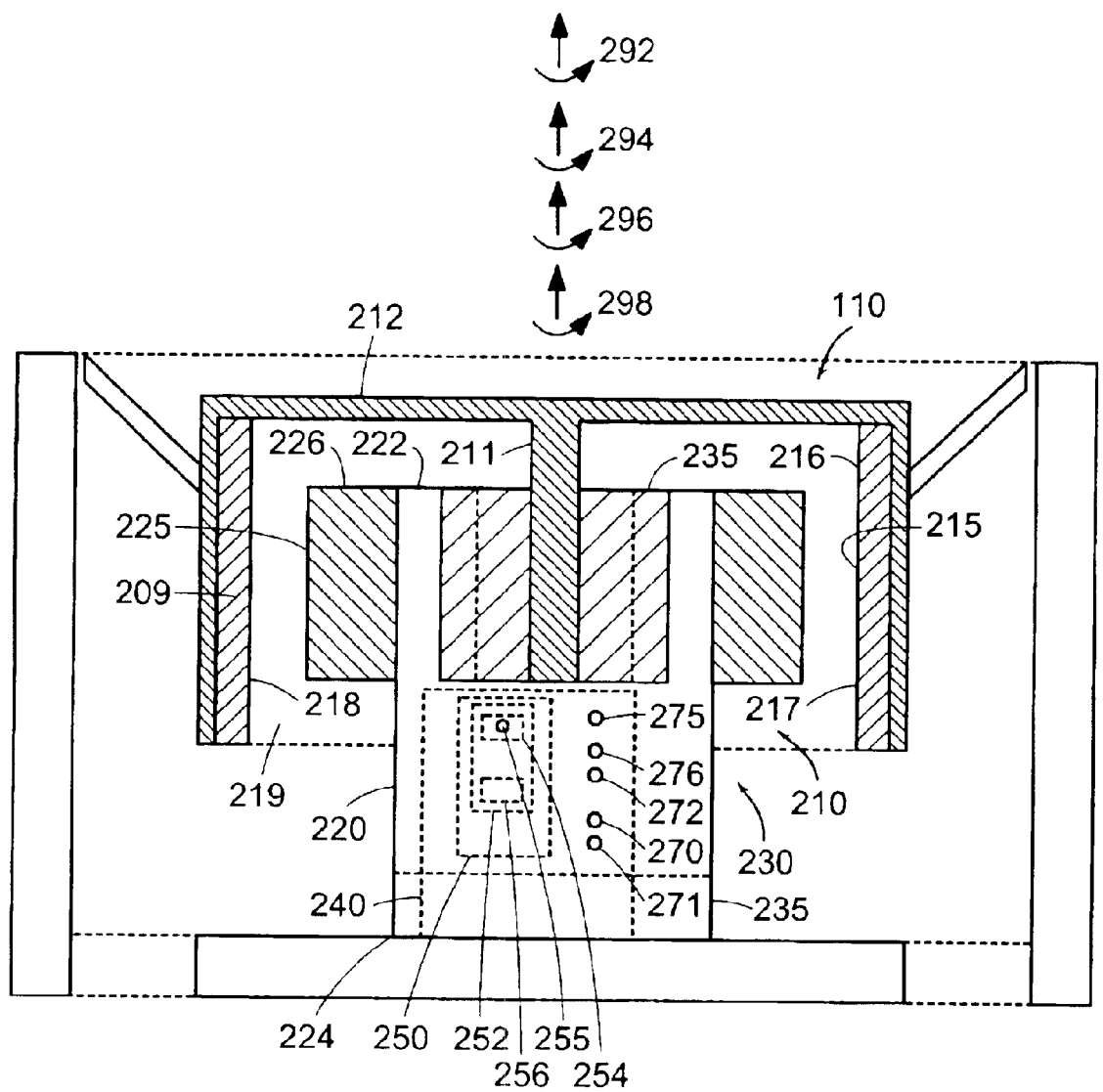
FIG. 2A and FIG. 2B are schematic vertical and horizontal cross-sectional views of the fan of FIG. 1.
Figure 2B:
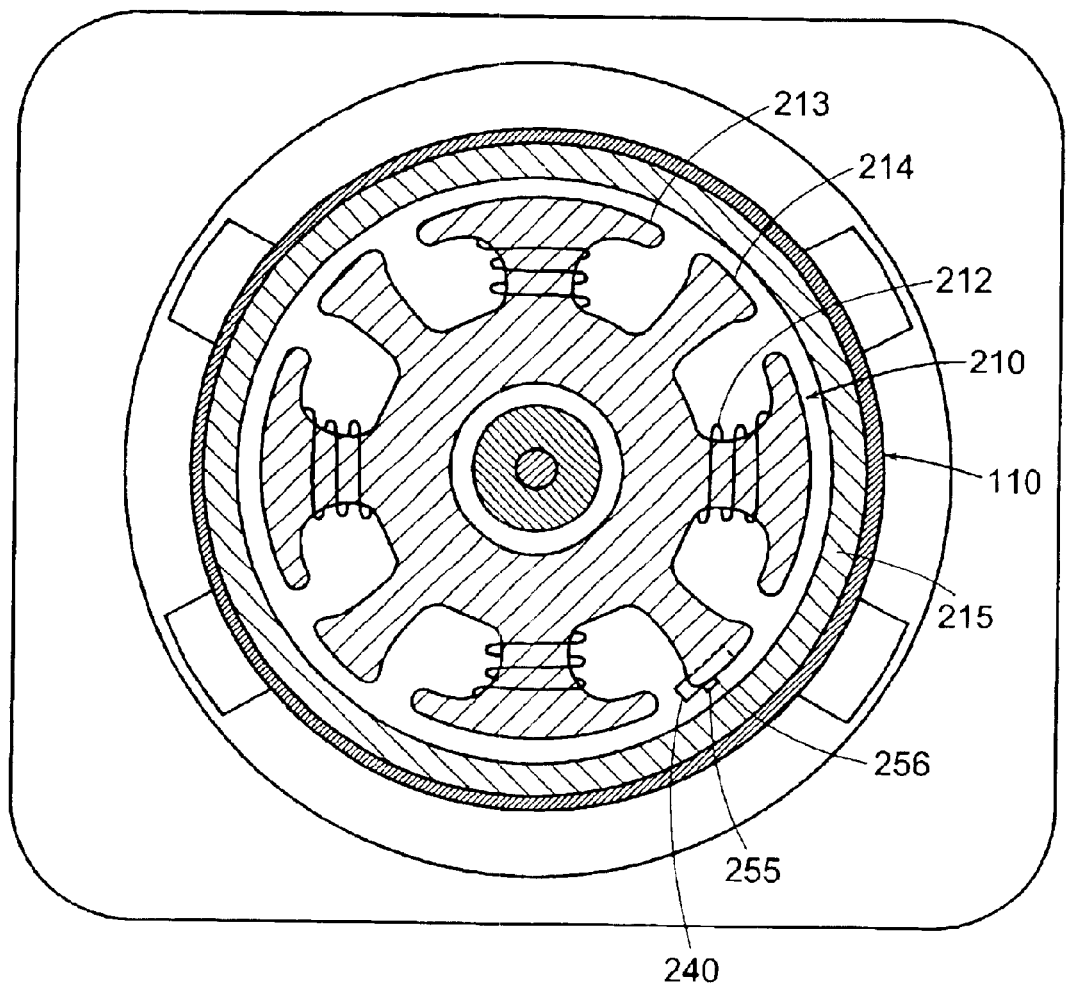

FIG. 2A and FIG. 2B schematically show vertical and horizontal cross-sectional views, respectively, of the cooling fan embodiment of FIG. 1. The fan 100 has a stator 210 that together with an arbor 220 forms an arbor-stator assembly 230. The stator 210 contains poles 213 and interpoles 214. The poles 213 carry windings 212 so connected that the magnetic field produced by current through the windings 212 reverses direction from one pole to an adjacent pole. The interpoles 214 positioned between adjacent poles 213 carry no current. In other embodiments, stators may be used that do not incorporate interpoles.

The rotor 110 is rotationally connected to the arbor-stator assembly 230 by conventional means, such as by a shaft 211 and by a pair of bearings 235. The rotor 110 also has a plurality of rotor magnets 215 that may contain a field section 216 and a commutating section 217. Since this embodiment contains a four pole motor, the direction of magnetization through the thickness of the commutating section 217 reverses direction every 90°. A rim 212 comprised of a highly permeable material such as steel surrounds an outer surface 209 of the magnets 215, thereby providing a return path for the magnetic flux. The rotor magnets 215 extend axially beyond a top 226 of the stator 210, tending to maintain the seating of the rotor shaft 211 within the bearings 235.

The rotor magnets 215 are spaced from, but circumscribed about, the outer surface 225 of the stator 210. The rotor magnets 215 have an inner rotor surface 218 that is considered to form a bounded region 219. This bounded region 219 effectively is a substantially cylindrical region bounded by the inner rotor surface 218 (i.e., by the rotor magnets 215, and, in some embodiments, by the commutating section 217 of the rotor magnets 215). In illustrative embodiments, the axis 294 of the arbor 220 coincides with the respective axes 292 and 296 of the rotor 110 and the bounded region 219.

In accordance with illustrative embodiments, a printed circuit board 240 having stator control circuitry mounts directly onto the arbor 220. Among other ways, the board 240 may be mounted at least in part by arbor snaps 235. Inputs to the printed circuit board 240 may be a supply voltage 270 and a ground 271. Outputs from the printed circuit board 240 may be connections to the stator windings 275 and 276 and a fault or tachometer signal 272. The printed circuit board 240 also has a surface mounted chip 250 containing a stator current controller circuitry 252 that further may contain a magnetic field detection circuitry 254 and a current driving circuitry 256. The magnetic field detection circuitry 254 may further contain a Hall effect device 255. One embodiment of such a surface mounted chip 250 is the Melexis S72/73.

To assure proper commutation, the board 240 is mounted to the arbor 220 so that Hall effect device 255 is within the bounded region 219. Moreover, to further ensure detection of rotor magnetic fields, the board 240 is illustratively located closer to the arbor bottom 224 than to the arbor top 222. In addition, to effect rotor rotation in a particular direction, the Hall effect device 255 may be displaced to one side of the position of symmetry between adjacent poles 215, i.e., to one side of the center of an intervening interpole 214.

FIG. 2B schematically illustrates the embodiment of FIG. 1 in horizontal cross-section. Stator windings 212 surround each stator pole 214 and control the size and orientation of the magnetic fields generated by the stator 210. Rotor rotation results from the interaction between fields generated by the magnets 215 and electrical currents through the stator windings 212. Magnets 215 are magnetized perpendicular to the inner rotor surfaces 218 and generate a magnetic field largely radial in direction within the bounded region 219. The stator 210 also generates a radial magnetic field as a result of current flowing through the stator windings 212 surrounding the stator poles 214. Current through stator windings 212 is sequentially reversed by stator current driving circuitry 256, based on the position of magnetic field of the rotor magnets 215 as detected by the Hall effect device 255. This sequential reversal of current through the stator windings 212 produces a torque on the rotor 110 of proper size and direction.

Figure 3:
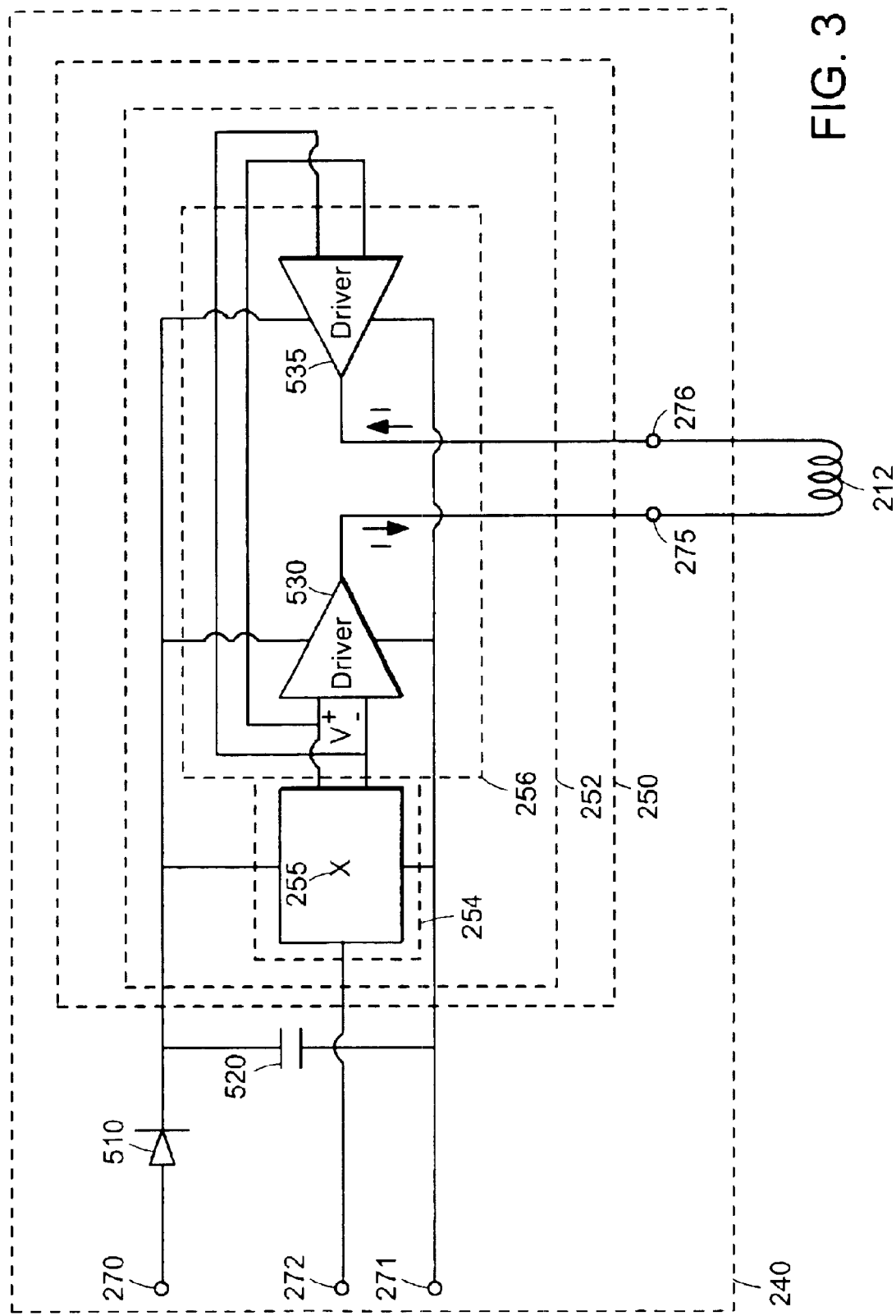
FIG. 3 is a functional diagram of illustrative magnetic field detection circuitry and current driving circuitry that may be within the fan shown in FIG. 1.

FIG. 3 shows a functional schematic diagram of an embodiment of the printed circuit board 240 containing the voltage supply input connection 270, the ground input connection 271, the stator winding output connections 275 and 276, the fault or tachometer output connection 272, and the surface mounted chip 250. The surface mounted chip 250 contains a diode 510, a capacitor 520, and the stator current controller circuitry 252. The stator current controller circuitry 252 contains the magnetic field detection circuitry 254 and the current driving circuitry 256. The magnetic field detection circuitry 254 contains the Hall effect device 255 located at X and the current driving circuitry 256 contains a driver 530 and a driver 535 with outputs 275 and 276 respectively connected to the stator winding 212. The magnetic field detection circuitry 254 generates a voltage V indicative of the magnetic field in which the Hall effect device 255 is immersed. The amplifiers 530 and 535 receive voltage V as input and furnish as output a current I that passes through stator coil 212. This circuit is exemplary, however, and thus not intended to limit the scope of the invention.

In alternative embodiments, the above discussed functionality on the printed circuit board 240 is split between two or more areas in the motor. In such embodiments, however, the Hall effect device 255 still is positioned as discussed above.

The described embodiments of the invention are intended to be merely exemplary and numerous variations and modifications will be apparent to those skilled in the art. All such variations and modifications are intended to be within the scope of the present invention as defined in the appended claims.

What is claimed is:

1. A stator current controller within an electric motor, the motor having a stator, a rotor with a rotor magnet, and an arbor to at least in part secure the rotor to the stator, the rotor having an inner surface defining a bounded region, the stator current controller comprising:

a circuit board coupled to the arbor and, at least in part, within the bounded region; and a magnetic field detector mounted on the circuit board for detecting a magnetic field produced by the rotor magnet, the magnetic field detector being within the bounded region;

wherein the circuit board is not perpendicular to an axis of the arbor.

2. The stator current controller as defined by claim 1 wherein the circuit board is a part of a flexible circuit.

3. The stator current controller as defined by claim 1 wherein the arbor has a top end and a bottom end, the magnetic field detection circuitry being closer to the bottom end than to the top end.

4. The stator current controller as defined by claim 1 wherein the magnetic field detector is contained in a chip that is surface mounted to the printed circuit board.

5. The stator current controller as defined by claim 4 wherein the magnetic field detector includes a Hall effect device.

6. The stator current controller as defined by claim 1 further including printed circuit board electrical connections wherein the printed circuit board electrical connections consist of connections to a voltage supply, to ground, and to a plurality of stator windings.

7. A stator current controller within an electric motor, the motor having a stator, a rotor with a rotor magnet, and an arbor to at least in part secure the rotor to the stator, the rotor forming a bounded region, the stator current controller comprising:

means for detecting a magnetic field produced by the rotor magnet;

means for mounting the detecting means; and means for coupling the mounting means to the arbor and, at least in part, within the bounded region;

wherein the mounting means is not perpendicular to the arbor.

8. The stator current controller as defined by claim 7 wherein the detecting means is positioned at least in part within the bounded region.

9. The stator current controller as defined by claim 7 wherein means for mounting includes a circuit board, the detecting means being surface mounted on the circuit board.

10. A stator current controller as defined by claim 7 further including means for generating a voltage proportional to the magnetic field.

11. A stator current controller as defined by claim 7 wherein means for coupling includes means for snapping the circuit board to the arbor.

12. A motor comprising:

a stator;

a rotor with a rotor magnet, the rotor forming a bounded region;

an arbor to at least in part secure the rotor to the stator;

a circuit board coupled to the arbor and, at least in part, within the bounded region; and a magnetic field detector mounted on the circuit board for detecting a magnetic field produced by the rotor magnet;

wherein the circuit board is not perpendicular to an axis of the arbor.

13. The motor as defined in claim 12 wherein the magnetic field detector at least in part lies within the bounded region.

14. The motor as defined by claim 12 wherein the arbor has a top end and a bottom end, the magnetic field detector being closer to the bottom end than to the top end.

15. The motor as defined by claim 12 wherein the magnetic field detector is contained in a chip surface mounted to the printed circuit board.

16. The motor as defined by claim 15 wherein the magnetic field detector includes a surface mounted Hall effect device.

17. The motor as defined by claim 12 wherein the motor is a brushless DC motor.

18. The motor as defined by claim 12 further including printed circuit board electrical connections wherein the printed circuit board electrical connections include connections to a voltage supply, to ground, and to stator windings.

* * * * *